(12) United States Patent
Rodriguez

(10) Patent No.: US 8,683,475 B2
(45) Date of Patent: Mar. 25, 2014

(54) METHOD AND APPARATUS FOR GRID ENABLING STANDARD APPLICATIONS

(75) Inventor: Peter P. Rodriguez, Pleasanton, CA (US)

(73) Assignee: International Business Machines Corporation, Armonk, NY (US)

(*) Notice: Subject to any disclaimer, the term of this patent is extended or adjusted under 35 U.S.C. 154(b) by 955 days.

(21) Appl. No.: 12/173,079

(22) Filed: Jul. 15, 2008

(65) Prior Publication Data

US 2008/0276263 A1 Nov. 6, 2008

Related U.S. Application Data

(63) Continuation of application No. 11/181,157, filed on Jul. 14, 2005, now abandoned.

(51) Int. Cl.
*G06F 9/46* (2006.01)

(52) U.S. Cl.
USPC .......................................... 718/104; 719/328

(58) Field of Classification Search
USPC .......................................... 718/104; 719/328
See application file for complete search history.

(56) References Cited

U.S. PATENT DOCUMENTS

| | | | |
|---|---|---|---|
| 6,876,668 B1 * | 4/2005 | Chawla et al. ................ | 370/468 |
| 7,421,500 B2 * | 9/2008 | Talwar et al. ................ | 709/227 |
| 7,661,030 B2 * | 2/2010 | Bozak et al. ................ | 714/25 |
| 7,810,090 B2 * | 10/2010 | Gebhart ........................ | 717/176 |
| 8,032,634 B1 * | 10/2011 | Eppstein et al. ............. | 709/226 |
| 8,086,707 B2 * | 12/2011 | Clement et al. .............. | 709/223 |
| 2002/0040285 A1 | 4/2002 | Boehm | |
| 2002/0052941 A1 | 5/2002 | Patterson | |
| 2003/0177187 A1 | 9/2003 | Levine et al. | |
| 2004/0003098 A1 | 1/2004 | Coffy et al. | |
| 2004/0064548 A1 | 4/2004 | Adams et al. | |
| 2004/0103195 A1 | 5/2004 | Chalasani et al. | |
| 2004/0205206 A1 * | 10/2004 | Naik et al. ................... | 709/230 |
| 2005/0038789 A1 * | 2/2005 | Chidambaran et al. ...... | 707/10 |
| 2005/0044228 A1 | 2/2005 | Birkestrand et al. | |
| 2005/0149940 A1 * | 7/2005 | Calinescu et al. ............ | 718/104 |
| 2005/0198247 A1 * | 9/2005 | Perry et al. .................. | 709/223 |
| 2005/0283782 A1 * | 12/2005 | Lu et al. ...................... | 718/100 |
| 2006/0075042 A1 * | 4/2006 | Wang et al. .................. | 709/206 |

* cited by examiner

*Primary Examiner* — Charles E Anya

(74) *Attorney, Agent, or Firm* — Scully, Scott, Murphy & Presser PC; Jeff Tang

(57) ABSTRACT

Disclosed are a method of and system for adapting a computer program to make use of a grid based system of resources, said grid based system using a given set of grid protocols. The method comprises the steps of providing a profile of the computer program; and providing a grid adapter including a series of application program interfaces (APIs) for interfacing said computer program to the grid based system using said one or more of said grid protocols. The profile is used to select one or more of the APIs to interface said computer program with one or more of the resources of the grid based system.

20 Claims, 3 Drawing Sheets

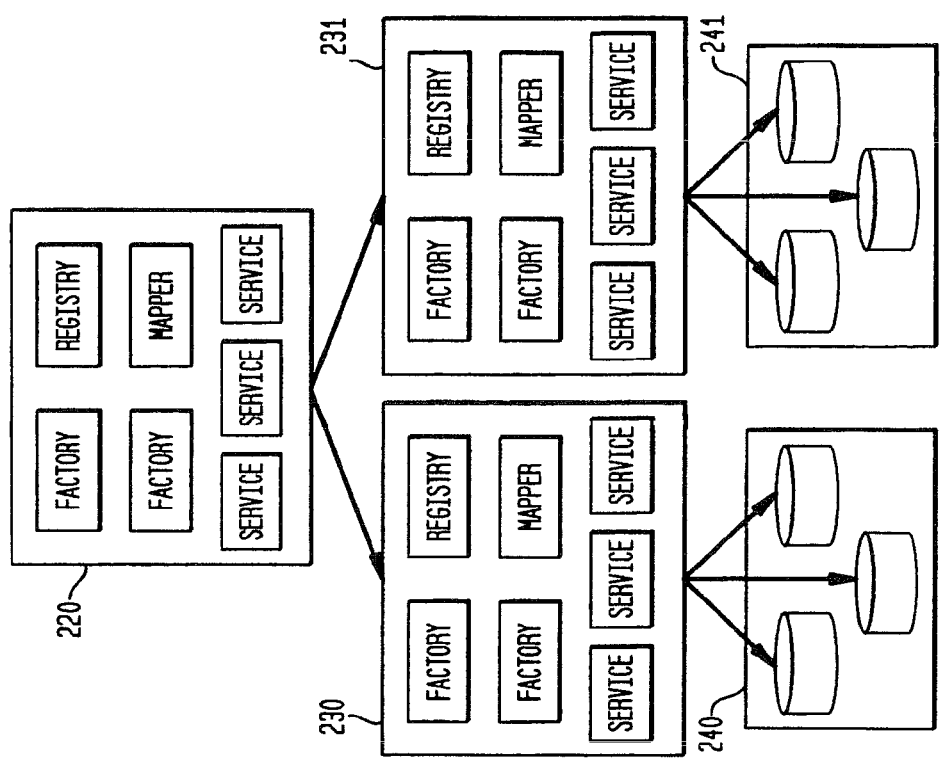
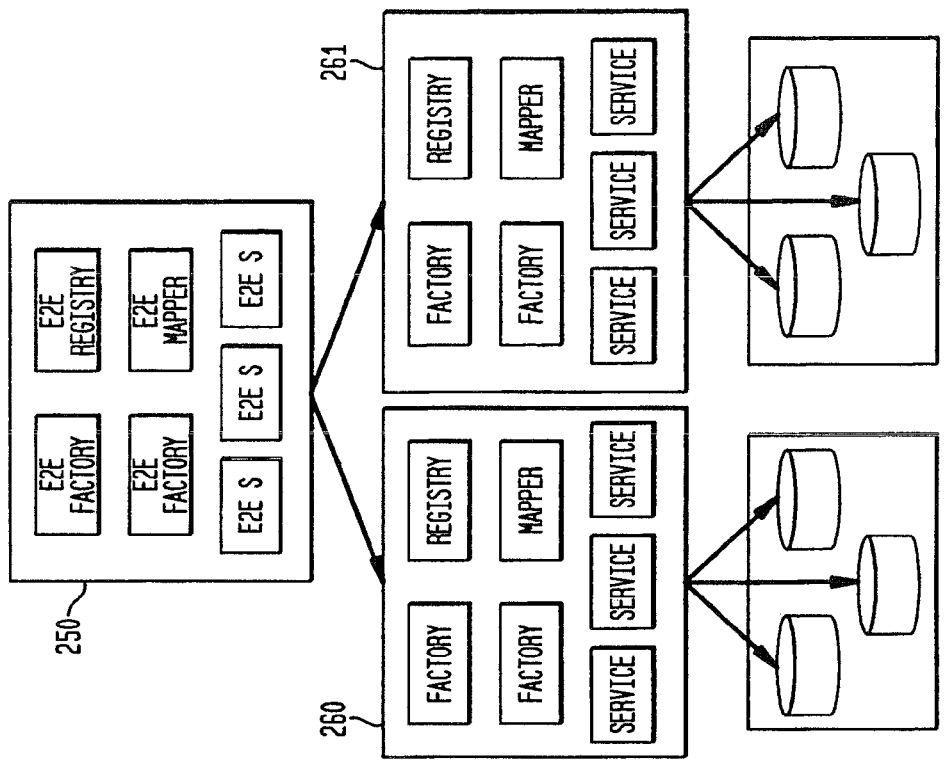

METHOD AND APPARATUS FOR GRID ENABLING STANDARD APPLICATIONS

CROSS-REFERENCE TO RELATED APPLICATION

This application is a continuation of co-pending application Ser. No. 11/181,157, filed Jul. 14, 2005, for "Method and Apparatus For Grid Enabling Standard Applications", the disclosure of which is herein incorporated by reference in its entirety.

BACKGROUND OF THE INVENTION

1. Field of the Invention

This invention generally relates to computer networks, and more particularly, the invention relates to the use of decentralized, collaborative networks having a grid infrastructure. Even more specifically, the invention relates to methods, systems, computer program products, and methods of doing business wherein network-accessible services are provided in a decentralized network having a federated grid infrastructure.

2. Background Art

An emerging trend in information technology in general, and in decentralized networks of the type provided by network service providers, is use of collaboration. This trend is evidenced by the level of investment in so-called "web services" and in the adoption of a number of open industry standards supporting web services. In general, the term "web service" refers to an interface that describes a collection of network-accessible operations. Web services technology is a mechanism for distributed application integration, and is also commonly refereed to as the "service-oriented architecture" for distributed computing. Web services fulfill a specific task or a set of tasks. They may work with one or more other web services in an interoperable manner to carry out their part of a complex workflow or a business transaction. For example, completing a complex purchase order transaction may require automated interaction between an order placement service (i.e., order placement software) at the ordering business and an order fulfillment service at one or more of its business partners. In turn, this order fulfillment service may interact with a credit card approval service, a package delivery service, and so forth.

With increased use of collaborative networking, efficient techniques for 'resource sharing will become critical. Resource sharing is complicated in conventional distributed or decentralized networks by the heterogeneity that exists when using technologies such as web services. In recent years, the academic and scientific communities cooperated to develop the concept of "grid technology" for sharing their resources. A "grid" may be defined as a collection of distributed computing resources available over a local or wide area network that appear to an end user or application as one large virtual computing system. A primary objective of grid computing is to create virtual dynamic organizations through secure, coordinated resource-sharing among individuals, institutions and resources. Grid computing is an approach to distributed computing that spans not only locations but also organizations, machine architectures and soft-ware boundaries to provide unlimited power, collaboration and information access to everyone connected to a grid Grid technology allows enterprises to share resources as they form "virtual organizations"—that is, the enterprises share their resources and services (which may be in geographically-widespread locations and which may have heterogeneous computing platforms) to form virtual computing services. (See "Grid Services for Distributed System Integration", I. Foster, et al., *Computer*, 35(6), 2002), for more information about grid technology.

Today an architecture referred to as "Open Grid Services" is being developed by academic and scientific communities, along with commercial entities such as International Business Machines Corporation ("IBM"), as an evolution of grid technology. This Open Grid Services architecture ("OGSA") enables a grid to provide enterprises with an extensible set of services that can be aggregated by the virtual organizations. According to OGSA, all computational resources, storage resources, networks, programs, databases, and so forth are modeled as services, providing a service-oriented view. OGSA leverages web services technology (and the open industry standards on which that technology is built) as well as grid technology.

The OGSA work effort includes an evolution of a programmer's toolkit referred to a "Globus Toolkit", which is designed to make creation of grid-based applications easier. The Globus Toolkit defines a "grid runtime" as a set of services. This set of services includes: (1). a Grid Resource Allocation and Management ("GRAM") protocol and "gatekeeper" service, designed to provide secure, reliable service creation and management; (2) a Monitoring and Discovery Service ("MDS-2") for information discovery; and (3) a Grid Security Infrastructure for single sign-on, delegation, and credential mapping.

One of the largest challenges in moving to a distributed architecture—such as a Service Oriented Architecture, is the idea that applications must be Architected, Designed, and Developed specifically with the architecture in mind. This is especially true for CORBAIJ2EE architectures—as well as Web Services based architectures.

In order to move an enterprise architecture to the GRID, after the design and infrastructure and even core services are provided via a GRID infrastructure, the challenge still remains to migrate a significant portion of the applications, programs, and services into the new paradigm. The migration effort typically means that applications must be rewritten with the GRID in mind. This includes but is not limited to the following for each application:

1) Redesign of the architecture to take advantage of a GRID computing platform. <Very Difficult> in some cases impossible without a wholesale re-engineering of the way the application works.
2) Refactoring an/or new development to access the GRID libraries, in our case OGSA development suite.
3) Design and performance testing.
4) Deployment.

Given that there are many applications in a typical Intranet, for large Intranets, thousands, the cost and effort to migrate to a GRID based strategy for even a few key applications can be enormous. Add to that the immaturity of the GRID infrastructure, API's and protocol, and the cost and time becomes prohibitive to do anything more than perhaps a few isolated applications as proof of concept or prototypes.

There, thus, clearly is a need for mechanisms and procedures to facilitate the adoption of current computer applications for use in a collaborative network having a grid infrastructure.

SUMMARY OF THE INVENTION

An object of this invention is to help adapt current running applications to make use of the grid based system.

Another object of the invention is to help enable currently running applications to realize the distributed grid resources without having to re-design or re-code those applications.

A further object of the present invention is to provide an adapter element that allows applications built for traditional environments to run in a grid environment.

These and other objectives are attained with a method of and system for adapting a computer program to make use of a grid based system of resources, said grid based system using a given set of grid protocols. The method comprises the steps of providing a profile of the computer program; and providing a grid adapter including a series of application program interfaces (APIs) for interfacing said computer program to the grid based system using said one or more of said grid protocols. The profile is used to select one or more of the APIs to interface said computer program with one or more of the resources of the grid based system.

The preferred embodiment of the invention, described below in detail, provides a grid adapter that can be use to grid enable any given application without incurring the cost of redesign and redevelopment. In some cases using a GRID adapter may not be the most efficient way to GRID enable an application, however the low cost to do the enablement will provide a simple, cost effective path for moving apps to the GRID. Since technology associated with the GRID is in a fast paced changing environment, in many cases, GRID adapters may be the best and only solution that can be considered from a business standpoint—if long term adaptability is desired.

Using GRID adapters, combined with the GRID profiling technology, (filed in a separate disclosure), at minimum represent an effective way to move traditional applications—to a distributed GRID infrastructure, and to better understand the requirements of the applications in place in any given environment.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIGS. 2A-2C show how virtual organizations may be structured using a grid service infrastructure according to the prior art.

DETAILED DESCRIPTION OF THE PREFERRED EMBODIMENTS

Before discussing the techniques of preferred embodiments in more detail, a brief description of grid services and how virtual organizations may be structured using a grid service infrastructure will be provided, referring to FIGS. 1 and 2A-2C.

Figure 1:
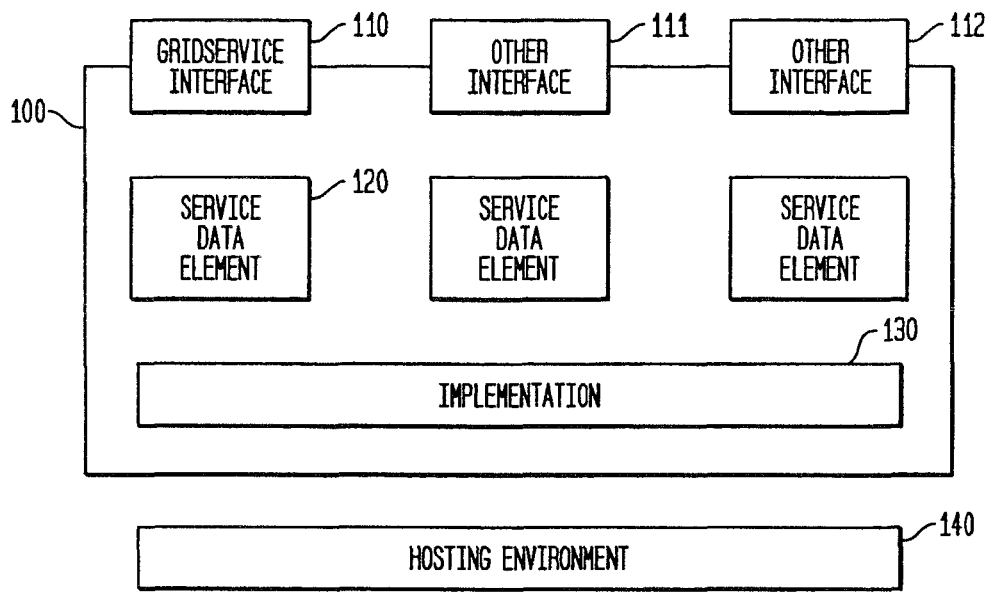
FIG. 1 illustrates a grid service according to the OSGA of the prior art.

FIG. 1 depicts a grid service 100, according to the OGSA of the prior art. A particular grid service may be offered by one or more hosting services, and each of these hosting services may provide one or more grid services. "Grid service" refers to a web service that is augmented with an additional interface, in order to be compliant with OGSA, and that follows certain conventions. According to the Grid Service Specification, a grid service is a Web Service Description Language (WSDL)—defined service that conforms to a set of conventions relating to its interface definitions and behaviors". (See Section 4, "The Grid Service", in the GSS.) According to OGSA, each grid service must implement the GridService interface 110, as shown in FIG. 1. This GridService interface includes functions for querying the GridService instance, setting its lifetime, and explicitly destroying the instance.

Additional interfaces specified in OGSA are optional, as shown at 111, 112. These optional interfaces may comprise one or more service-specific, interfaces, and/or one or more of the OGSA interfaces. The OGSA interfaces (some of which remain to be defined) include a Factory interface for dynamic creation of grid service instances; notification functions that enable service instances to communicate with one another asynchronously; a Registry interface for registering instance handles; a Mapping interface for locating a grid service instance by its handle; an authorization interface; a policy management interface; and a manageability interface providing functions for monitoring and managing grid service instances. A WSDL portType is preferably used to specify the service interfaces of each grid service, and the collection of portTypes that each grid service supports is preferably specified using a serviceType element. (The serviceType element is an extension to WSDL that is defined for use with grid services).

One or more service data elements 120 are provided for each grid service. A service data element is a named, typed XML element encapsulated in a container. The service data elements for a particular grid service instance each provides service data for that instance, and has a unique name, a type, and a time-to-live (to be used for lifetime management). The information in the service data element allows requesters to find information about the grid service instance, including dynamically-created information (using introspective techniques, for example), and also allows the instance to be managed. (The "FindServiceData" operation of the Gridservice interface may be used to query a service data element.)

Each grid service may be provided by one or more implementations 130. Some implementations may be local to the environment in which the requester is operating, while others may be remotely located. The WSDL specification for the grid service allows requesters to access an implementation transparently (e.g., without regard to the programming language in which the service is implemented or the location of the service instance). A grid service can be hosted by one or more hosting environments 140 (which may alternatively be referred to as "execution environments"). The hosting environment determines the programming model, programming language, development and debugging tools that are available, and so forth. For example, an implementation of a grid service might be written as a procedure-oriented program using the "C" programming language and execute on a particular operating system platform, and another implementation of this same grid service might be written as an object oriented program on the Java™ programming language and execute on the Websphere platform from IBM. These concepts are known in the art, and will not be described in detail herein. ("Java" is a trademark of Sun Microsystems, Inc., and "Websphere" is a registered trademark of IBM).

Figure 2A:
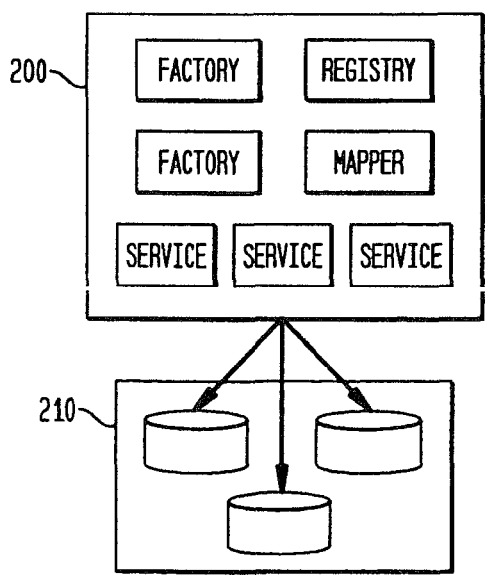

FIG. 2A illustrates how a simple hosting environment may be structured, where the resources 210 of a grid service 200 are located within the grid service's local network domain. The resources in FIGS. 2A-2C are shown as storage resources, although this is by way of example only.) This simple hosting environment comprises one or more factory instance (which may be used to create new grid services, as stated above), a registry of the available factories, and a mapper (used to locate a particular grid service instance given its globally-unique handle or identifier.

FIG. 2B shows a virtual hosting environment structure; where (for this example) two sets of resources 240, 241 are located within distinct network domains. The virtual organization ("VO") still provides an interface 220 as in FIG. 2A, comprising one or more factory instances, a registry of the available factories, and a mapper. Behind this VO interface 220 may be a collection of simple hosting environment interfaces of the type shown in FIG. 2A. In this example, two simple hosting environment interfaces 230, 231 provide accessibility to their resources 240,241.

As with web services, the behaviors of one or more grid services may be aggregated to compose another grid service. This is illustrated by the interface to "end-to-end" grid service 250 in FIG. 2C, where the factory interface is now designated as an "end-to-end" ("E2E") factory, the services are "end-to-end" services ("E2E S"), and so forth. The E2E factory instances in this case create new instances of the end-to-end or aggregated grid service, and the E2E registry instance tracks and advertise those E2E factory instances. The E2E factory instances preferably interact with lower-level factory instances (for example, from grid service 260 and/or 261), asking those lower-level factories to create service instances that can then be aggregated to create the end-to-end grid service 250. (An end-to-end grid service may alternatively be referred to as a "collective" or "virtual" grid service).

As demonstrated by FIGS. 2A-2C, a client can access a grid service and its resources in an identical manner, where the grid service interface is identical regardless of which hosting environment has been used to provide that grid service and those resources.

As mentioned above, one of the largest challenges in moving to a distributed architecture—such as a Service Oriented Architecture, is the idea that applications must be Architected, Designed, and Developed specifically with the architecture in mind. This is especially true for CORBA1J2EE architectures—as well as Web Services based architectures.

In order to move an enterprise architecture to the GRID, after the design and infrastructure and even core services are provided via a GRID infrastructure, the challenge still remains to migrate a significant portion of the applications, programs, and services into the new paradigm. The migration effort typically means that applications must be rewritten with the GRID in mind. This includes but is not limited to the following for each application:

1) Redesign of the architecture to take advantage of a GRID computing platform. <Very Difficult> in some cases impossible without a wholesale re-engineering of the way the application works.
2) Refactoring and/or new development to access the GRID libraries, in our case OGSA development suite.
3) Design and performance testing.
4) Deployment.

Given that there are many applications in a typical Intranet, for large Intranets, thousands, the cost and effort to migrate to a GRID based strategy for even a few key applications can be enormous. Add to that the immaturity of the GRID infrastructure, API's and protocol, and the cost and time becomes prohibitive to do anything more than perhaps a few isolated applications as proof of concept or prototypes.

The preferred embodiment of the invention provides a grid adapter that can be used to grid enable any given application without incurring the cost of redesign and redevelopment. In some cases using a GRID adapter may not be the most efficient way to GRID enable an application, however the low cost to do the enablement will provide a simple, cost effective path for moving apps to the GRID. Since technology associated with the GRID is in a fast paced changing environment, in many cases, GRID adapters may be the best and only solution that can be considered from a business standpoint—if long term adaptability is desired.

Using GRID adapters, combined with the GRID profiling technology (disclosed in co-pending application Ser. No. 11/181,120, filed herewith, for "Method and System For Application Profiling For Purposes of Defining Resource Requirements," now abandoned (the disclosure of which is herein incorporated by reference), at minimum represents an effective way to move traditional applications—to a distributed GRID infrastructure, and to better understand the requirements of the applications in place in any given environment.

Figure 3:
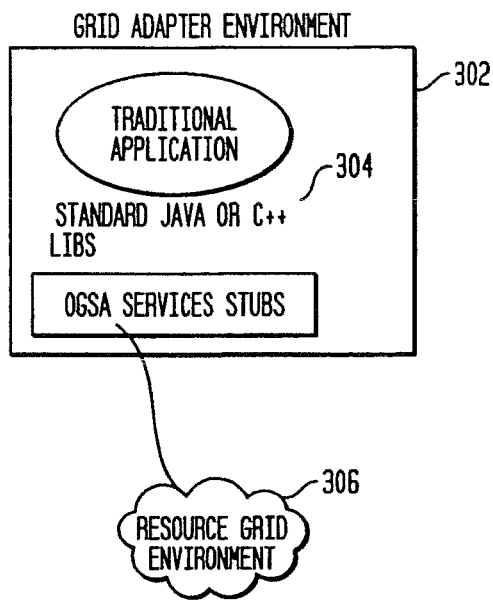
FIG. 3 schematically depicts a grid adapter environment embodying this invention.
Figure 4:
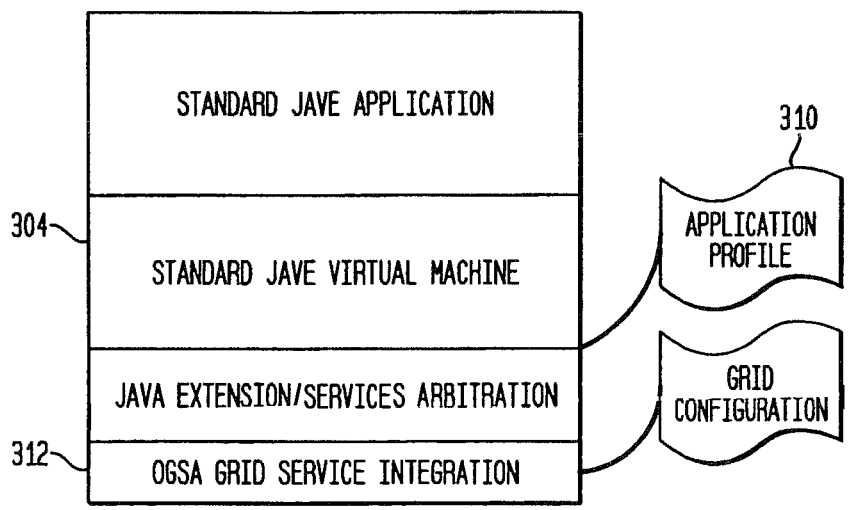
FIG. 4 schematically depicts the use of a grid adapter to allocate network resources.

More specifically, with reference to FIGS. 3 and 4, a GRID adapter is essentially an abstraction layer built into a given environment, represented at 302, such as a JAVA VM, or a C++ runtime library, represented at 304. The GRID adapter thus provides an environment to execute C++ or Java code, by providing a standard set of API's that are based on the J2SE, J2EE, or C++ Shared libraries (for Linux this includes libstdc++, for AD (the equivalent shared libraries, in the Microsoft world these may be MSC C++ dynamically linked libraries.

The difference between a GRID Adapter set of libraries and the equivalent development environment libraries are that the GRID version enables access using standard GRID protocols to the greater, distributed, GRID resources, represented at 306, transparently. Thus when an applications require the use of CPU (System calls), or Data Storage (usually also system calls)—these services could be conceivably provided locally as they are today or provided via a GRID service from some distributed GRID participant. The key to determining how a particular application gets it's resources fulfilled, be it GRID supplied, or locally supplied is determined by an XML profile mechanism that is pre-generated for any given application. The profile 310 (described in the above-identified patent application Ser. No. 11/181,120, provides a view into the resource requirements of the application by instrumenting the target application with monitoring hooks, running that application for a reasonable amount of time under normal loading conditions, to understand the footprint (size and memory requirements of the application), I/O and CPU resource usage. What is generated then as a profile 310 becomes essentially a scoring table that is used to determine what areas of the application's resources are candidates to be GRID enabled. The GRID adapter, as represented at 312, then uses the profile, to allocate resources either locally or by GRID enabled means to supply the application with the resources.

It is conceivable then that some threshold, x, is determined as optimal performance considerations for enabling a certain percentage of any given application to be GRID enabled. Using the applications profile, the GRID adapter, may determine to enable 0-100% of the resources required from the GRID pool of resources. Importantly, this is all done in a transparent way from the application's point of view, in essence it is simply executing in a stand alone environment as it was before—and is therefore unaware of any greater GRID resource pool.

The implications to this are significant in terms of speed of deployment, and Total Cost of ownership for each application.

It should be noted that the grid services concepts and syntax are undergoing revisions, and thus the operation names, parameter names, and so forth that are used herein to describe preferred embodiments might change during this revision process. Accordingly, the examples used herein are provided for purposes of illustration and not of limitation; alternative messages, operations, interfaces, formats, syntax, and so forth may be used without deviating from the scope of the present invention.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product, which is embodied on one or more computer-usable storage media (including, but not limited to, disk storage, CD-ROM, optical storage, and so forth) having computer-usable program code embodied therein.

The present invention has been described with reference to flow diagrams and/or block diagrams of methods, apparatus (systems) and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer readable or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

What is claimed is:

1. A method of adapting a computer program to make use of a grid based system of resources to share distributed heterogeneous resources and services of the grid based system among a plurality of locations, organizations, machine-architectures and software boundaries, said grid based system using a given set of grid protocols, the method comprising:

using a grid adapter including a series of application program interfaces (APIs) for interfacing said computer program to the grid based system by enabling and adapting the computer program to access the distributed heterogeneous resources and services of the grid based system of resources and services using said one or more of said grid protocols, including generating a profile of the computer program by determining a plurality of specified characteristics of the computer program, wherein the profile is used to determine areas of the computer program that are candidates of grid enablement, including using the grid adapter to provide a view into resource requirements of the computer program by running the computer program for a period of time; and said grid adapter using said profile, including one or more of the specified characteristics, to select one or more of the APIs to interface said computer program with one or more of the resources of the grid based system and to allocate one or more resources of the grid based system to the application program; and wherein the grid adapter transparently interfaces said computer program to the grid based system of resources, wherein when the computer program requires resources, the grid adapter determines, transparent to the computer program, to allocate resources to the computer program either locally or from the grid based system of resources.

2. A method according to claim 1, wherein the grid adapter provides an environment to execute one or more given computer codes.

3. A method according to claim 1, wherein said allocated resources are allocated either locally or by grid enabled means.

4. A method according to claim 1, wherein the grid adapter determines to enable a calculated percentage of the resources required from the grid based system.

5. A method according to claim 1, wherein the step of using said profile includes the step of the grid adapter determining a threshold value as optimal performance considerations for enabling a certain percentage of any given application to be grid enabled.

6. The method according to claim 1, wherein the using the grid adapter includes using said profile to determine areas of the computer program that are candidates to be enabled to access the resource and services of the grid based system.

7. The method according to claim 1, wherein the using the grid adapter to provide a view into the resource requirements of the computer program includes using the grid adapter to provide the view into the resource requirements of the computer program by instrumenting the computer program with monitors and running the computer program for said period of time under loading conditions.

8. The method according to claim 1, wherein:
the profile is pre-generated before one or more resources of the grid based system are allocated to the application program;
the grid adapter determines to enable a specified percentage of the program to be enabled to receive resources from the grid based system; and
the generating a profile includes generating a scoring table for determining the areas of the computer program that are candidates for grid enablement.

9. A system for adapting a computer program to make use of a grid based system of resources to share distributed heterogeneous resources and services of the grid based system among a plurality of locations, organization, machine-architectures and software boundaries, said grid based system using a given set of grid protocols, the system comprising:
one or more processing units configured for:

implementing a grid adapter including a series of application program interfaces (APIs) for interfacing said computer program to the grid based system by enabling and adapting the computer program to access the distributed heterogeneous resources and services of the grid based system of resources and services using said one or more of said grid protocols; and generating a profile of the computer program by determining a plurality of specified characteristics of the computer program, wherein the profile is used to determine areas of the computer program that are candidates of grid enablement, including using the grid adapter to provide a view into resource requirements of the compute program by running the computer program for a period of time; and said grid adapter using said profile, including one or more of the specified characteristics, to select one or more of the APIs to interface said computer program with one or more of the resources of the grid based system and to allocate one or more resources of the grid based system to the application program; and wherein the grid adapter transparently interfaces said computer program to the grid based system of resources, wherein when the computer program requires resources, the grid adapter determines, transparent to the computer program, to allocate resources to the computer program either locally or from the grid based system of resources.

10. A system according to claim 9, wherein the grid adapter provides an environment to execute one or more given computer codes.

11. A system according to claim 9, wherein said allocated resources are allocated either locally or by grid enabled means.

12. A system according to claim 9, wherein the grid adapter determines to enable a calculated percentage of the resources required from the grid based system.

13. A system according to claim 9, wherein the grid adapter using said profile includes determining a threshold value as optimal performance considerations for enabling a certain percentage of any given application to be grid enabled.

14. A program storage device readable by machine, tangibly embodying a program of instructions executable by the machine to perform method steps for adapting a computer program to make use of a grid based system of resources to share distributed heterogeneous resources and services of the grid based system among a plurality of locations, organization, machine-architectures and software boundaries, said grid based system using a given set of grid protocols, said method steps comprising:

using a grid adapter including a series of application program interfaces (APIs) for interfacing said computer program to the grid based system by ending and adapting the computer program to access the distributed heterogeneous resources and services of the grid based system of resources and services using said one or more of said grid protocols;

including generating a profile of the computer program by determining a plurality of specified characteristics of the computer program, wherein the profile is used to determine areas of the computer program that are candidates of grid enablement, including using the grid adapter to provide a view into resource requirements of the compute program by running the computer program for a period of time;

said grid adapter using said profile, including one or more of the specified characteristics, to select one or more of the APIs to interface said computer program with one or more of the resources of the grid based system and to allocate one or more resources of the grid based system to the application program; and wherein the grid adapter transparently interfaces said computer program to the grid based system of resources, wherein when the computer program requires resources, the grid adapter determines, transparent to the computer program, to allocate resources to the computer program either locally or from the grid based system of resources.

15. A program storage device according to claim 14, wherein the grid adapter provides an environment to execute one or more given computer codes.

16. A program storage device according to claim 14, wherein said allocated resources are allocated either locally or by grid enabled means.

17. A program storage device according to claim 14, wherein the grid adapter determines to enable a calculated percentage of the resources required from the grid based system.

18. A method of providing end-to-end grid services, from a grid of computer services, to a computer program to share distributed heterogeneous resources and services of the grid based system among a plurality of locations, organization, machine-architectures and software boundaries, the method comprising the steps of:

using a utility application to execute the computer program;

using a result of said execution of the computer program to identify specific performance requirements of the computer program;

using a grid adapter including a series of application program interfaces (APIs) for interfacing said computer program to the grid of computer services by enabling and adapting the computer program to access the distributed heterogeneous resources and services of the grid based system of resources and services using said one or more of said grid protocols;

including generating a profile of the computer program by determining a plurality of specified characteristics of the computer program, wherein the profile is used to determine areas of the computer program that are candidates of grid enablement, including using the grid adapter to provide a view into resource requirements of the compute program by running the computer program for a period of time;

said grid adapter using said determined profile, including one or more of the identified performance requirements, to select and to allocate grid services, from said grid, for the computer program;

providing the computer program with the allocated grid services; and wherein the grid adapter transparently interfaces said computer program to the grid based system of resources, wherein when the computer program requires resources, the grid adapter determines, transparent to the computer program, to allocate resources to the computer program either locally or from the grid based system of resources.

19. A method according to claim 18, wherein said computer services includes:

computational resources, storage resources, networks, programs, databases, internal I/O services, and external I/O services.

20. A method of adapting a computer program to make use of a grid based system of resources to share distributed heterogeneous resources and services of the grid based system among a plurality of locations, organization, machine-architectures and software boundaries, said grid based system using a given set of grid protocols, the method comprising:

generating a profile of the computer program by determining a plurality of specified characteristics of the computer program;

using a grid adapter including a series of application program interfaces (APIs) for interfacing said computer program to the grid based system using said one or more of said grid protocols to adapt the computer program to access the distributed heterogeneous resources of the grid based system of resources and services, wherein the grid adapter transparently interfaces said computer program to the grid based system of resources, wherein when the computer program requires resources, the grid adapter determines, transparent to the computer program, to allocate resources to the computer program either locally or from the grid based system of resources; and said grid adapter using said profile, including one or more of the specified characteristics, to select one or more of the APIs to interface said computer program with one or more of the resources of the grid based system and to allocate one or more resources of the grid based system to the application program; and wherein the using the grid adapter includes using the grid adapter to provide a view into the resource requirements of the computer program by instrumenting the computer program with monitoring hooks, running the computer program for a period of time under loading conditions, to understand size and memory requirements of the computer program, I/O and CPU resource usage.

\* \* \* \* \*